(12) United States Patent
Panse

(10) Patent No.: US 7,306,851 B2
(45) Date of Patent: *Dec. 11, 2007

(54) PATCH REPAIR SYSTEM FOR COLLAPSIBLE FUEL AND WATER TANKS

(75) Inventor: Dattatreya Ramesh Panse, Warwick, RI (US)

(73) Assignee: Cooley, Incorporated, Pawtucket, RI (US)

( * ) Notice: Subject to any disclaimer, the term of this patent is extended or adjusted under 35 U.S.C. 154(b) by 83 days.

This patent is subject to a terminal disclaimer.

(21) Appl. No.: 10/739,361

(22) Filed: Dec. 18, 2003

(65) Prior Publication Data

US 2005/0112968 A1    May 26, 2005

Related U.S. Application Data

(63) Continuation-in-part of application No. 10/723,145, filed on Nov. 26, 2003.

(51) Int. Cl.
*B32B 27/00* (2006.01)
*B32B 27/40* (2006.01)
*B32B 3/00* (2006.01)

(52) U.S. Cl. ............... 428/425.3; 428/160; 428/422.8
(58) Field of Classification Search ............... 428/160, 428/422.8, 438; 442/62, 66, 149
See application file for complete search history.

(56) References Cited

U.S. PATENT DOCUMENTS

| | | |
|---|---|---|
| 4,662,959 A | 5/1987 | Morgan |
| 4,874,445 A | 10/1989 | Lavoie |

(Continued)

OTHER PUBLICATIONS

Bayer Material Science—Product Information Article—USA Effective Jul. 1, 2002.

(Continued)

*Primary Examiner*—Lynda Salvatore
(74) *Attorney, Agent, or Firm*—Lowrie, Lando & Anastasi, LLP

(57) ABSTRACT

The invention is a patch system for repairing collapsible fuel tanks, water tanks, inflatable boats, and other articles fabricated from a flexible structural fabric coated with a polymer. The coated structural fabric is made of nylon or polyester synthetic fibers or a blend thereof, which are coated with a thermoplastic elastomer. The structural coated fabric is coated with a thermoplastic elastomer that is a urethane (TPU), or a TPU alloy polymer. Likewise, the patch is a urethane adhesive having a latent cure coated on a TPU film. The patch can also have an integral reinforcing fabric for applications requiring a higher tensile patch. In the invention, the urethane adhesive of the patch is solvent activated by the application of a thin coating of a volatile, substantially low odor, fugitive solvent like acetone or MEK. While in the activated state, the adhesive has much less cyrstallinity and a lot more tack. The solvent activated adhesive has good wetting, and aggressively wets out and adheres to the surface of the TPU coating on the tank. The activated adhesive side of the patch is pressed against the surface of the tank. The solvent will also partially etch the thermoplastic urethane polymer coating on the tank fabric, and rapidly diffuses therein, ultimately evaporating to the surroundings. The cross-linkable urethane adhesive contains a blocked isocyanate and, preferably, an uretdione. The reduced cyrstallinity in the adhesive imparts greater freedom to the blocked isocyanate that can, depending on the equilibrium of the system, begin to cross-link the adhesive. The curing process can be accelerated through the application of heat, albeit will slowly progress to a cured state at ambient conditions.

24 Claims, 5 Drawing Sheets

U.S. PATENT DOCUMENTS

| | | | |
|---|---|---|---|
| 4,946,739 A * | 8/1990 | Chapman et al. | 442/71 |
| 5,091,239 A | 2/1992 | Przeworski et al. | |
| 5,281,288 A | 1/1994 | Murray et al. | |
| 5,312,645 A * | 5/1994 | Dressler | 427/148 |
| 5,658,634 A * | 8/1997 | Ragland et al. | 428/75 |
| 6,309,507 B1 * | 10/2001 | Morikawa et al. | 156/331.4 |
| 6,582,759 B1 | 6/2003 | Qiu et al. | |
| 6,596,819 B2 * | 7/2003 | Morikawa et al. | 525/457 |
| 2005/0112971 A1 * | 5/2005 | Panse | 442/149 |

OTHER PUBLICATIONS

Bayer Material Science—Product Information—USA Effective Aug. 1, 2004.

* cited by examiner

PATCH REPAIR SYSTEM FOR COLLAPSIBLE FUEL AND WATER TANKS

CROSS REFERENCE TO RELATED APPLICATION

This application is a continuation-in-part of co-pending Utility application Ser. No. 10/723,145, filed on Nov. 26, 2003.

BACKGROUND OF THE INVENTION

1. Field of the Invention

The present invention relates to patches for flexible materials and, more particularly, to a method and a patch repair system for repairing collapsible tanks and the like constructed of flexible materials.

2. Prior Art

The following patents were located which pertain to the invention.

| U.S. Pat. No. | Issued | Inventor | Title |
| --- | --- | --- | --- |
| 4,874,445 | Oct. 17, 1989 | Patrick J. Lavoie | Method for Repairing Fuel Tanks |
| 4,662,959 | May 5, 1987 | Howard F. Morgan | Fiberglass Gasoline Tank Repair Process |
| 5,281,288 | Jan. 25, 1994 | Thomas J. Murray, et al. | Tape for Affixing a Grip and Process for Using Same |
| 5,091,239 | Feb. 25, 1992 | Richard A. Przeworski, et al. | Methods and Adhesives for Bonding Polyolefin Film |
| 6,582,759 | Jun. 24, 2003 | Zai-Ming Qiu, et al. | Optical Elements Comprising a Fluorinated Surface Treatment Comprising Urethane, Ester or Phosphate Linkages |

Patrick Lavoie, in U.S. Pat. No. 4,874,445, discloses a method for repairing fuel tanks wherein after cleaning the surface of the tank a plastisol compound is spread over the damaged area and then heated. The method provides a fast and inexpensive procedure for repairing fuel tanks. The tanks are typically fabricated from steel and need repair because of rust and other corrosion.

In U.S. Pat. No. 4,662,959, Howard Morgan teaches a method for repairing gasoline tanks using a glass resin blend. His method is designed typically to repair fiberglass gasoline tanks.

The concept of using solvent activated adhesives is known in the art of adhesives, albeit not specifically to the repair of collapsible tanks and the like. A commonly employed application is the use of a solvent applied to a double-sided pressure sensitive tape to facilitate the installation of a grip onto a golf club. In U.S. Pat. No. 5,281,288, Tom Murray discloses in the background a method for using double-sided tape to mount the grip on the club. In the method the tape is wound around the end of the shaft and then coated with a solvent. The solvent improves the wetting capability of the adhesive and temporarily dissolves the adhesive enough so that it becomes slippery. While the adhesive is slippery the golf club grip can be slid onto the shaft. The solvent also helps the adhesive absorb the dust on the inside of the grip, and to bite into the interior walls of the rubber grip. Ultimately, the solvent is absorbed by the grip and evaporates leaving the adhesive to return to its former state, where it had a relatively high shear.

Another example of using solvent activated adhesives is provided in U.S. Pat. No. 5,091,239 by Przeworski. In the last line of column 1, Przeworski introduces the phrase "solvent activated adhesive," where a solvent activated adhesive is one that is not sticky until plasticizing by the addition of solvent. This process of plasticizing the adhesive is known as solvent activation of dry adhesives. In column 2, line 30 he describes how a solvent is activated. "The solvent activated dry adhesive is preferably a thermoplastic, hard urethane with or without suitable additives." In column 3, beginning on line 28 Przeworski goes on to say that the dry adhesive may comprise a single polyurethane or a mixture of one or more polyurethanes having an additive such as isocyanate. The dry adhesive as disclosed in this invention is coated on an olefinic film such as MOPP and BOPP. MOPP, and BOPP are oriented polypropylene films, not polyurethane thermoplastics. Other potential additives cited by Przeworski that can be added to the polyurethane adhesive include aziridine and/or a prepolymer made from di and trifunctional diols admixed with isocyanate. In column 4, lines 13-18, typical activating solvents mentioned include toluene, methyl ethyl ketone, ethyl acetate, methylene chloride, acetone, and tetrahydrofuran for TPU. Thermoplastic elastomer Kraton® is activated with hexane, cyclohexane, pentane and isopentane. Krayton is a trade name for Shell Chemicals' block copolymers, which usually have styrenic end-blocks and a butadienic or isoprenic polymeric mid-block.

In U.S. Pat. No. 6,582,759, Zai-Ming et al disclose optical elements which, in column 17, lines 64 and 65 utilize a solvent activated adhesive that can employ a uretdione. Examples are cited in column 20, lines 7 and 8. The art is very removed from tank repair, but this patent does utilize both a solvent activated adhesive, a urethane and an internally blocked isocyanate (uretdione).

SUMMARY OF THE INVENTION

The invention is a patch system for repairing collapsible fuel tanks, water tanks, inflatable boats, and other articles fabricated from a flexible structural fabric coated with a polymer. The coated structural fabric is typically comprised of polymer fibers, such as nylon or polyester or a blend thereof, which are coated with a thermoplastic elastomer. In a preferred construction, the structural coated fabric is coated with a thermoplastic elastomer that is a urethane (TPU) or a TPU alloy polymer. Similarly, the patch system is a flexible coated material comprised of a TPU or TPU alloy polymeric film coated with a urethane adhesive having a latent cure. The TPU or TPU alloy polymeric film and the urethane adhesive preferably are similar to the urethanes utilized in the manufacture of the tanks, inflatable boats, and other articles. These TPUs generally have regions of relatively high crystallinity, yet are still highly elastic and flexible. In larger patches requiring greater tensile strength, the patch is further comprised of a reinforcing fabric. The patch can be formed by extruding or calendering the urethane adhesive having a latent cure onto the TPU or TPU alloy polymeric film. It is generally desired that the thermoplastic polyurethane film is similar or identical in physical appearance and properties to the TPU applied to the structural fabric used in the construction of the tank. Alternatively, the patch can be formed by co-extruding the urethane adhesive and the TPU polymer. In either case, the adhesive is cross-linkable and substantially a TPU or TPU alloy that has, potentially reactive sites. A hydroxyl group is illustrative of a potentially reactive site. The TPU or TPU alloy can be pigmented, dyed, or otherwise colored so that it is the same color as the thermoplastic polymer on the tank. Additionally, the surface of the TPU can be embossed to mimic the flexible structural fabric used in the collapsible tank, etc. In the invention, the cross-linkable urethane adhesive is solvent activated by the application of a thin coating of a volatile, substantially low odor, fugitive solvent like acetone or MEK or ethyl acetate. While in the activated state, the adhesive has much less cyrstallinity and a lot more tack. The solvent plasticized adhesive has far better wetting, and aggressively wets out and adheres to the surface of the TPU coating on the tank. In this state, the activated side of the patch is pressed against the surface of the tank. The solvent will also partially etch the thermoplastic urethane polymer on the tank, and rapidly diffuses therein, ultimately evaporating to the surroundings. The cross-linkable urethane adhesive contains a blocked isocyanate, and preferably a uretdione. The reduced cyrstallinity imparts greater freedom to the blocked isocyanate which can, depending on the equilibrium of the system, begin to cross-link the adhesive. The curing process can be accelerated through the application of heat, albeit will slowly progress to a cured state at ambient conditions.

It is anticipated that the fugitive solvent can contain additives that enhance the bond strength of the patch to the TPU coated on flexible structural fabric. For example, a catalyst such as a hindered amine (e.g. triethylene diamine), or an organometallic catalyst (e.g. dibutyl tin dilaurate) increases the reaction rate of the blocked isocyanate when the isocyanate is unblocked. The fugitive solvent can also include an active curing component, which reacts with the pendant hydroxyl groups on the adhesive. Various examples of the active curing component are a polymeric isocyanate or a transesterification catalyst, which are usually titanates. Examples of organotitanate compounds are tetra-isopropyl titanate tetra(2-ethylhexyl) titanate, tetraisopropyl titanate, and tetrabutyl titanate, and isopropyl triethanolaminatotitanate. In the case of isocyanate active curing components the solvent is typically an aromatic solvent like toluene or xylene. The fugitive solvent can also contain thickeners, such as hydroxyl ethyl cellulose and solvent soluble TPUs, to enable thicker coatings of fugitive solvent to be applied when the patch is being fastened.

If the damaged area being repaired is sufficiently large enough, then mechanical reinforcement, in addition to the patch, can be included as part of the repair system. The damaged area can be stitched, for instance with monofilament line, wire, or thread. Various combinations are anticipated. The damaged area can be cross-stitched, stitched with a reinforcing panel, stitched through the patch and then over patched. The type and degree or damage will be determinate of the preferred mechanical reinforcement. In some cases plugs can be used.

The system also includes components for preparing the surface of the damaged area of the collapsible tank, etc. that is to be repaired. Surface preparation components include abrading tools or sandpaper, hand roller, soaps, wetting agents, surface tension agents, cleaners, water, solvents, brushes, sponges, heaters, driers and primers. A typical primer would be a fugitive solvent comprising a soluble TPU. As described above, the damaged area is prepped prior to adhering the patch coated with the fugitive solvent. For most repairs, the system will normally require minimum preparation of the surface as the invention has excellent wetting.

DETAILED DESCRIPTION

Figure 1:
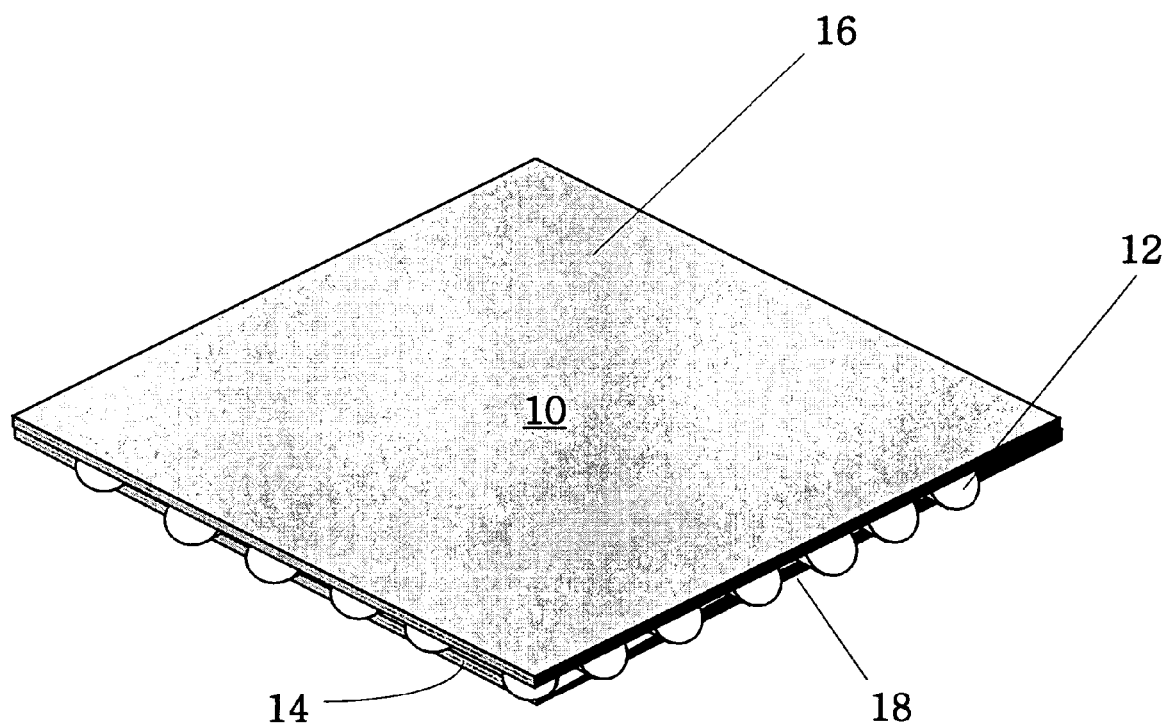
FIG. 1 is a perspective view of the patch system for repairing collapsible fuel tanks, water tanks and other articles fabricated from a flexible structural fabric coated with a thermoplastic polymer.

The invention is a patch system for repairing collapsible fuel tanks, water tanks and other articles fabricated from a flexible structural fabric coated with a thermoplastic polymer. Collapsible fuel and water tanks fabricated using a structural fabric, such as nylon or polyester, or a blend thereof, coated with a thermoplastic elastomeric material. In a preferred construction, the structural fabric is coated with a thermoplastic, polyurethane (TPU) or a TPU alloy. In the invention the patch is comprised of a layer of urethane adhesive coated onto film of a TPU or TPU alloy. The urethane adhesive has a latent cure, which is activated with heat. The urethane adhesive is extruded or calendered onto the TPU film. In patches that require greater tensile strength, which are usually needed to repair larger damaged areas, the patch further includes a reinforcing fabric. Fibers suitable for reinforcing fabrics are well known in the art. Typically, the fibers are polyamide, polyimide, polyester, or glass; albeit in certain applications polypropylenes, HD polyethylenes, cellulosics, urethanes, and other specialized polymers can be appropriately selected. TPUs used in tank manufacture generally have regions of relatively high crystallinity, yet are still highly elastic and flexible. The TPU can be comprised of a single TPU or a TPU alloy. Like the TPU used in the coated structural fabric in collapsible fuel tanks, water tanks and other articles, the patch can also be pigmented, dyed, or otherwise colored so that it is the same color as the thermoplastic on the tank. The invention is a system and, as such, in addition to the patch, the invention includes components and methods used to effect the repair. When the patch 10 is applied, as shown in FIG. 1, it is coated with a fugitive solvent 18 forming a laminate that is applied to a side opposing the thermoplastic resin 16 just prior to fastening the patch 10. The fugitive solvent is selected from the group consisting of: ketones, aldehydes, esters, aromatic hydrocarbons, ethers, chlorinated alkanes, and blends thereof. The urethane adhesive 14 is cross-linkable and is solvent activated (partially dissolved/plasticized) by the application of a thin coating of the fugitive solvent 18, which preferably is a substantially low odor, volatile solvent like acetone or MEK or ethyl acetate.

Figure 2:
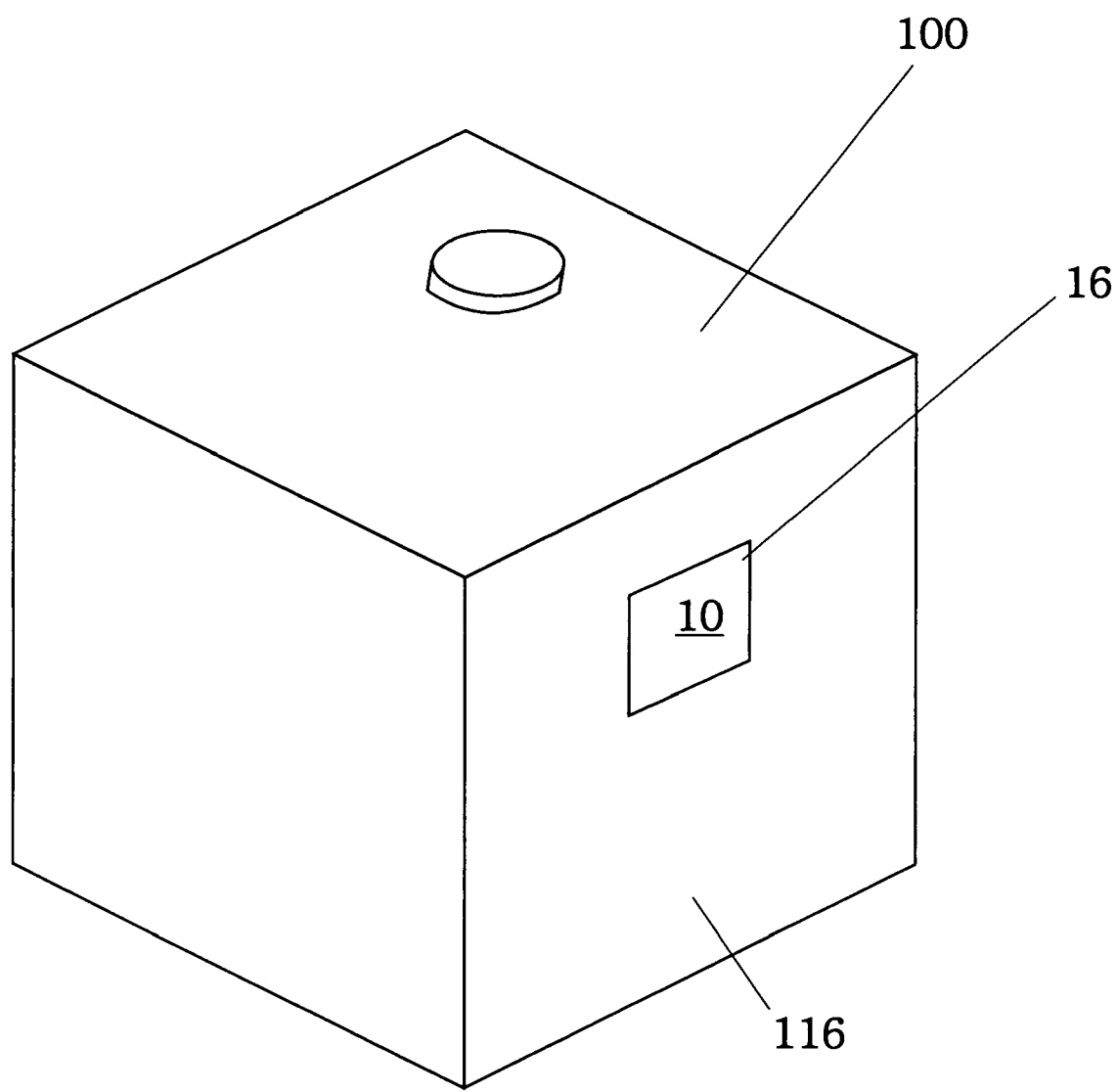
FIG. 2 is a perspective view of a collapsible tank repaired with a patch.

While in the activated state, the activated side 18 of the patch 10 is pressed against the surface of the tank 100, as shown in FIG. 2. The solvent etches the thermoplastic urethane 116 on the surface of the tank, and rapidly diffuses therein, ultimately evaporating to the surroundings. The cross-linkable urethane adhesive 14 contains a blocked isocyanate, which in the presence of heat will rapidly cross-link the urethane adhesive 14, and at ambient conditions will slowly cure.

Examples of suitable cross-linkable urethane adhesives are Bayer's Desmomelt™ 540 and Desmomelt™ 530. Desmomelt 540 is a predominately linear hydroxyl polyurethane, where the polyurethane is of the polyester type. The hydroxyl content is less than 1%. The activation temperature is approximately 60° C. It is described as having a very high crystallinity with a crystallization of at least 10 as measured using test DIN 53 240, and very low thermoplasticity. Desmomelt 530 has a slightly lower activation temperature, approximately 55° C., slightly higher crystallinity and slightly lower molecular weight.

The application of the fugitive solvent when fastening the patch 10 lowers the activation temperature, breaking up most of the crystallites, therein making the adhesive much tackier with superior wetting. The solvent also enables the latent cure component, uretdione, which prior to activation is substantially frozen in the crystalline matrix of the urethane adhesive, to be more mobile and free to react with the hydroxyl groups. The urethane adhesive 14 is compounded with a latent isocyanate based cross-linker, a hydrolytic stabilizer and a cross-link enhancer. The isocyanate is internally blocked, and as previously stated the preferable internally blocked isocyanate is a uretdione. Uretdiones disassociate at temperatures in excess of 300° F. Uretdiones of IPDI are particularly suitable, as they are cycloaliphatic and, therefore, are relatively non-yellowing. Commercial grades of uretdiones, which are poly-uretdiones of IPDI are CRELAN® VP LS 2347, VESTAGON® EP-BF-1320, VESTAGON BF 1540. VESTAGON® BF 1540 is a Degussa product. It is uretdione-poly adduct having an NCO content of 15.2-17.0% wt. VESTAGON EP-BF-1320 is also a uretdione-poly adduct, having an NCO content 13.0-14.5% wt. VESTAGON EP-BF-1320 has a higher functionality than BF 1540. It is supplied as a coarsely ground powder. CRELAN® VP LS 2347 and CRELAN® VP LS 2147 are Bayer uretdione "hardeners". The cross-linkable urethane adhesive 14 is further compounded with a cross-link enhancer, such as hydroxyalkylamide. Examples of a hydroxyalkylamide include N,N,N',N'-tetrakis(2-hydroxyethyl)adipamide, which is commercially sold under the brand name Primid XL-552, and N,N,N',N'-tetrakis(2-hydroxypropyl)adipamide, which is commercially sold under the name of Primid QM-1260. Primid® is a trade name of Ems-Chemie AG, Switzerland. The disclosed hydroxyalkylamide has a functionality of four, and is very effective at increasing the cross-link density. The adhesive is further comprised of a hydrolytic stabilizer such as a carbodiimide. A suitable carbodiimide is bis(2,6-di-2-propylphenyl)carbodiimide, sold under the trade name of Stabaxol® of Bayer. Rhein Chemie sells various grades of bis(2,6-di-2-propylphenyl)carbodiimide as masterbatches, which facilitates mixing. The blocked isocyanate preferably is a dimer of a diisocyanate, a multi-uretdione adduct or a combination thereof. Uretdiones are selected from the group consisting of dimers of TDI, MDI, XDI, IPDI, $H_{12}$MDI and HMDI.

Figure 4:
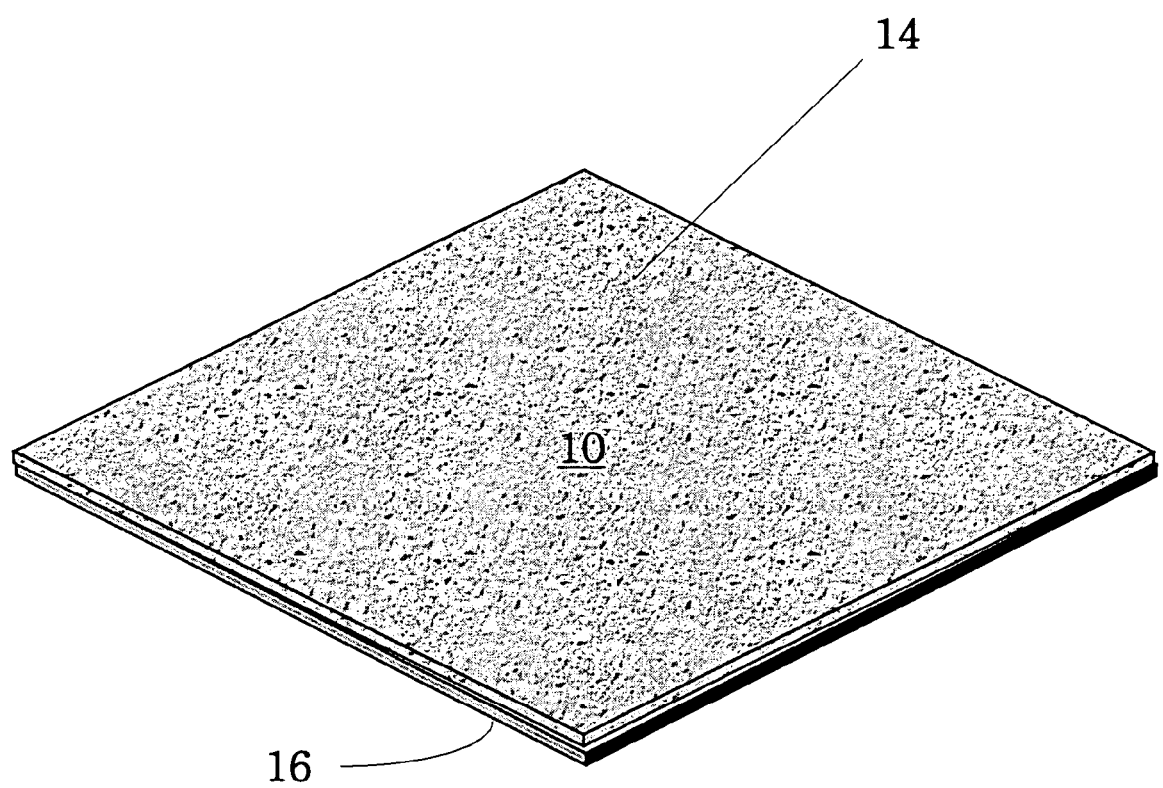
FIG. 4 is a perspective view of the adhesive side of a patch that is comprised of a TPU or TPU alloy polymeric film coated with a urethane adhesive having a latent cure.
Figure 5:
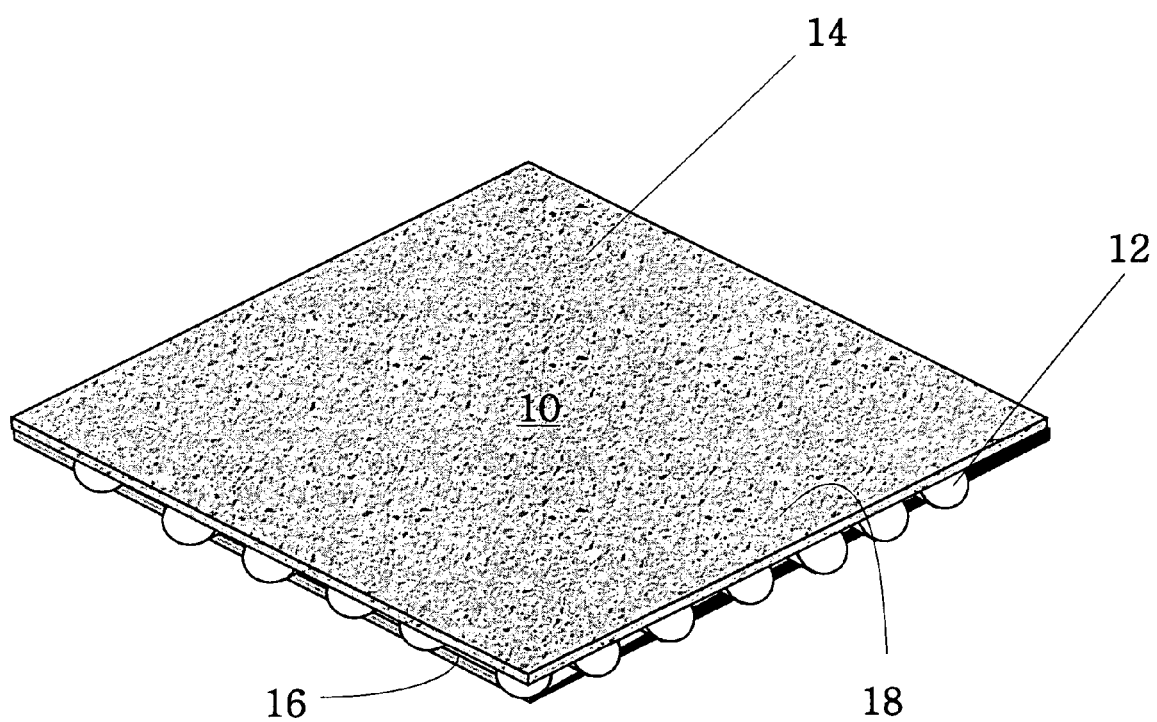
FIG. 5 is a perspective view of the adhesive side of a patch that is comprised of a reinforcing fabric, a TPU, or TPU alloy polymeric film coated with a urethane adhesive having a latent cure.

The reinforcing fabric used in the patch is selected from nylon or polyester, albeit as previously discussed other materials are suitable. Generally, it is desirable that the tensile modulus of the patch fabric match the tensile modulus of the coated structural fabric used in the panels of the tanks, etc., so that the shear is equally distributed over the patch. In the case of inflatable boats, ballistic cloth is normally used, and ballistic cloth usually incorporates polyimides (e.g. Kevlar® by Dupont) or Nylon or ultra high molecular weight polyethylene (UHMW polyethylene). The reinforcing fabric can also be a blend of organic and/or inorganic fibers (i.e. fiber glass). Therefore, a similar fabric should be employed in the patch. FIG. 4 illustrates a patch 10 having a urethane adhesive 14 coated onto an extruded TPU film 16. FIG. 5 illustrates a patch 10 that is strengthened with a reinforcing fabric 12. The TPU 16 coated on the patch is a high molecular weight polyester type thermoplastic TPU. Representative commercial grades that are suitable are ESTANE 58277, ESTANE 58226, ELASTOLLAN 695A15, PELLETHANE 2355, and DESMOPAN 285. ESTANE® is a registered trademark of Noveon, Inc., ELASTOLLAN® is a registered trademark of BASF Corporation, DESMOPAN is a registered trademark of BAYER Corporation and PELLETHANE® is a trademark of Dow. The preferred TPUs are polyester type polyurethanes having good hydrolytic stability, a Vicat softening point greater than 170° F., and a Shore A Durometer of greater than 88. The tensile is preferably greater than 5000 psi.

In preparing the adhesive, a twin screw extruder can be used to compound all the components and then form pellets. The pellets are then extruded as a thin film onto the appropriate fabric for the patch material, and then the TPU is extruded onto the adhesive film. An alternative method is to co-extrude the adhesive and TPU together, or onto the reinforcing fabric. The extrusion temperature is adjusted so that minimum curing takes place inside the extruder.

Below are two examples of the adhesive formulation.

EXAMPLE 1

In a twin screw extruder are added 2000 wt. units of Desmomelt 540 (a linear hydroxyl polyurethane adhesive), 200 wt. units of Vestagon BF 1320 (uretdione internally blocked cross-linked) and 12 wt. units of Staboloxol P (carbodiimide-hydrolytic stabilizer). The components are mixed and pelletized.

EXAMPLE 2

In a twin screw extruder are added 1500 wt. units of Desmomelt 540 (a linear hydroxyl polyurethane adhesive), 150 wt. units of Vestagon BF 1320 (uretdione internally blocked cross-linked isocyanate), 12 wt. units of Staboloxol P (carbodiimide-hydrolytic stabilizer), and 50 wt. units of Primid (N,N,N',N'-tetrakis(2-hydroxyethyl)adipamide, a cross-link enhancer). The components are mixed and pelletized.

Prior to extruding the thermoplastic resin (TPU), the TPU is dried. The water content is preferably less than 0.03%. Masterbatches of fillers, colorants, and reinforcing additives are compounded as desired. Nominally, additional antioxidants, UV stabilizers and processing aides are not required. Coating weights are appropriately adjusted for the denier and count of the thread.

Figure 3:
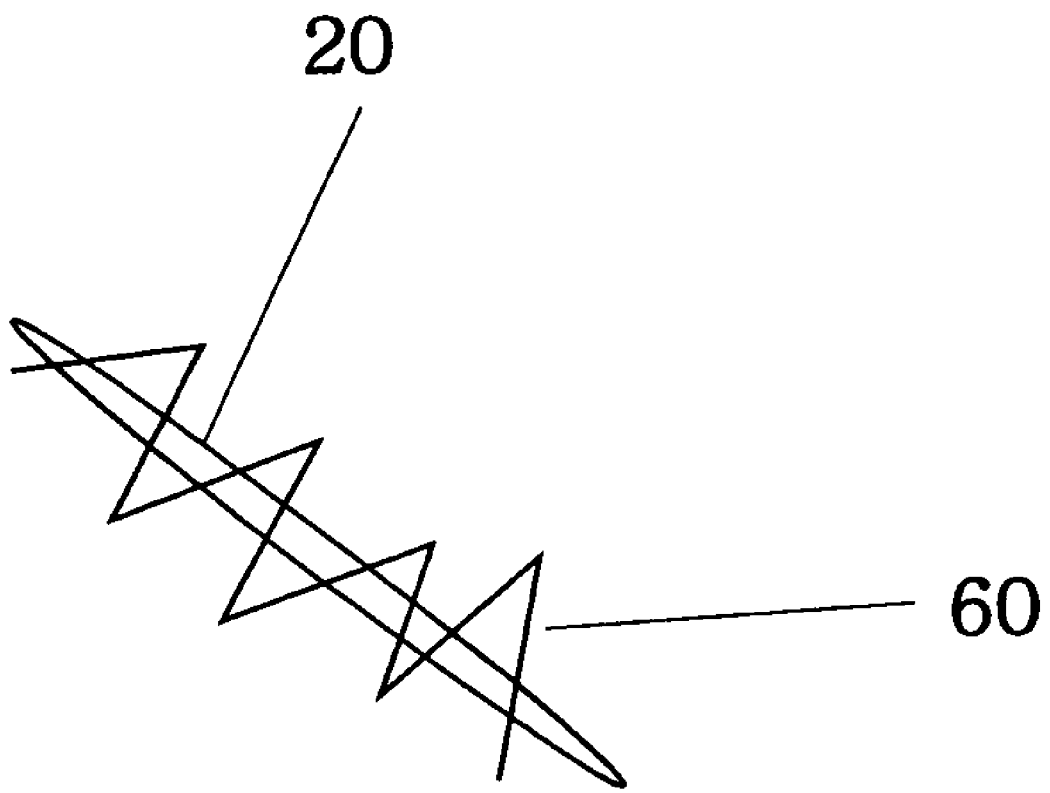
FIG. 3 is a planar view of an indeterminate section of a collapsible tank having a slit shaped damaged area that is cross-stitched with monofilament line.

The invention is a method for applying a patch repair system to a damaged area of a collapsible fuel and water tanks and other articles fabricated from a flexible structural fabric coated with a thermoplastic polymer, wherein said system is a patch comprised of an as needed, reinforcing fabric, an extruded adhesive having a latent thermally activated curing component; and a thermoplastic resin coated onto the extruded or calendered adhesive. The method is comprised of the steps of: measuring and preparing the damaged area; cutting to size or selecting a pre-cut patch that is at least as large as required; applying a fugitive solvent to a side of the patch opposing said thermoplastic resin;

pressing the patch against the coated flexible structural fabric of the collapsible fuel and water tanks and other articles therein, covering the damaged area; and continuing to apply pressure until the solvent is substantially dissipated and evaporated. The method can further be comprised of applying heat from about 260° F. to about 350° F. for 20-45 minutes. If necessary, as shown in FIG. 3, the damaged area 20 can be cleaned, abraded, and pre-stitched with monofilament line or thread 60 prior to applying the solvent activated patch. Following patching, the bond strength of a test strip of the patch can be measured to ensure that the desired level of adhesion has been attained. The strength of the bond should meet or exceed 25 lbs/in. Various components, such as primers, cross-linking agents, and catalysts can be applied along with the fugitive solvent to assure adequate bond strength is achieved.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A patch repair system, said system comprising:
   a laminate comprised of a layer of a thermoplastic resin and a layer of a coating of a highly crystalline thermoplastic, predominately linear hydroxyl polyurethane (TPU) adhesive, with a crystallization of at least 10 as measured using test DIN 53 240, said adhesive having a latent thermally activated curing component; said adhesive coating providing the laminate with an adhesive surface that when activated forms an adhering patch to a collapsible tank and the like having a damaged area; and
   a fugitive solvent selected from the group consisting of a ketone, an aldehyde, an ester, an aromatic hydrocarbon, an ether, a chlorinated alkane and blends thereof applied to the surface of the adhesive, said applied fugitive solvent temporarily activating the adhesive such that until the solvent dissipates, the crystallinity of the TPU adhesive is disrupted making the adhesive tackier with superior wetting, and mobilizing the latent cure component enabling curing of the adhesive.

2. The patch repair system, as claimed in claim 1, wherein said latent curing component is a blocked isocyanate.

3. The patch repair system, as claimed in claim 2, wherein said TPU adhesive has pendant hydroxyl groups.

4. The patch repair system, as claimed in claim 2, wherein said thermoplastic resin is a thermoplastic polyurethane resin.

5. The patch repair system, as claimed in claim 4, wherein said thermoplastic resin has a medium to a high level of crystallinity.

6. The patch repair system, as claimed in claim 2, wherein the blocked isocyanate is a dimer of a diisocyanate, a multi-uretdione adduct or a combination thereof.

7. The patch repair system, as claimed in claim 6, wherein the blocked isocyanate is a uretdione selected from the group consisting of dimers of toluene diisocyanate (TDI), methylene diisocyanate (MDI), xylene diisocyanate (XDI), isophorone diisocyanate (IPDI), hydrogenated methylene diisocyanate ($H_{12}$MDI), and hexamethylene diisocyanate (HMDI).

8. A patch repair system according to claim 1, wherein said TPU adhesive is further comprised of a cross-linking enhancer.

9. The patch repair system, as claimed in claim 8, wherein the cross-linking enhancer is a compound with at least two hydroxyl groups.

10. The patch repair system, as claimed in claim 9, wherein the cross-linking enhancer is selected from the group consisting of: a hydroxyalkylamide, pentaerythritols; mono, di and tri alkanol amines; glycols; abitol; butylene glycol; cyclohexanedimethanol; diethylene glycol; dipentaerythritol; dipropylene glycol; glycerine; hexylene glycol; hydrogenated Bisphenol A; methyl 1,2 propanediol; neopentylglycol; propylene glycol; sorbitol; triethylene glycol; trimethylolpropane; tripentaerythritol, alkoxy and hydroxyl alkoxy cellulose, simple sugars like fructose, sucrose, glucose and starches.

11. A patch repair system according to claim 2, wherein said TPU adhesive is further comprised of a hydrolytic stabilizer.

12. The patch repair system, as claimed in claim 11, wherein the hydrolytic stabilizer is selected from the group consisting of carbodiimides, polycarbodiimide, and epoxidized soy bean oil.

13. The patch repair system, as claimed in claim 2, wherein the thermoplastic resin is compounded to include other additives such as reinforcing fibers, extenders, fillers, antioxidants, UV stabilizers, thermal stabilizers, flame retardants, glass beads, colorants, antimicrobial agents, dyes, pigments, processing aides (i.e., waxes, fluorinated compounds, silicone compounds, surfactants, polymeric processing aides), density modifiers such as phenolic beads, desiccants, buffers, and IR absorbent compounds to facilitate heating (i.e., carbon blacks, graphite, metal oxides).

14. The patch repair system, as claimed in claim 2, wherein the said TPU adhesive is compounded to include other additives such as reinforcing fibers, extenders, antioxidants, UV stabilizers, thermal stabilizers, flame retardants, fillers, glass beads, colorants, antimicrobial agents, dyes, pigments, processing aides (i.e., waxes, fluorinated compounds, silicone compounds, surfactants, polymeric processing aides), density modifiers such as phenolic beads, desiccants, buffers, and IR absorbent compounds to facilitate heating (i.e., carbon blacks, graphite, metal oxides).

15. The patch repair system, as claimed in claim 1, wherein the ketone is acetone.

16. The patch repair system, as claimed in claim 1, wherein the ether is tetrahydrofuran.

17. The patch repair system, as claimed in claim 1, wherein the ester is ethyl acetate.

18. A patch repair system, according to claim 1, wherein the laminate is further comprised of a reinforcing fabric.

19. The patch repair system, as claimed in claim 18, wherein the reinforcing fabric is comprised of fibers formed from polyamide, polyimide, polyester, or glass.

20. A patch repair system, according to claim 1, wherein the fugitive solvent further comprises a catalyst.

21. A patch repair system, according to claim 1, wherein the fugitive solvent further comprises an active curing component.

22. The patch repair system, as claimed in claim 20, wherein said catalyst is selected from the group consisting of amines and organo-metallic agents.

23. The patch repair system, as claimed in claim 21, wherein said active curing component is selected from the group consisting of isocyanates and transesterification agents.

24. The patch repair system, as claimed in claim 1, wherein the ketone is methyl ethyl ketone.

* * * * *